(12) United States Patent
Zückert et al.

(10) Patent No.: US 6,489,398 B1
(45) Date of Patent: *Dec. 3, 2002

(54) WATER-DILUTABLE BRUSHING PAINT BASED ON WATER-SOLUBLE ALKYD RESINS

(75) Inventors: Bertram Zückert, Graz (AT); Rami-Raimund Awad, Graz (AT); Walter Weger, Graz (AT)

(73) Assignee: Solutia Austria GmbH, Werndorf (AT)

(*) Notice: Subject to any disclaimer, the term of this patent is extended or adjusted under 35 U.S.C. 154(b) by 0 days.

This patent is subject to a terminal disclaimer.

(21) Appl. No.: 07/969,521

(22) Filed: Oct. 30, 1992

Related U.S. Application Data

(63) Continuation of application No. 07/561,269, filed on Jul. 31, 1990, now abandoned, which is a continuation of application No. 07/207,870, filed on Jun. 17, 1988, now abandoned.

(30) Foreign Application Priority Data

Jun. 17, 1987 (AT) ................................................ 1541/87

(51) Int. Cl.$^7$ ............................................. C09D 167/08
(52) U.S. Cl. .......................... 525/167.5; 525/7; 525/64; 528/295.5; 524/504; 524/513
(58) Field of Search ................................ 525/167.5, 64, 525/7; 528/295.5; 524/504, 513

(56) References Cited

U.S. PATENT DOCUMENTS 3,894,978 A * 7/1975 Montesissa ............... 260/404.8
4,333,865 A * 6/1982 Zuckert ....................... 523/410

FOREIGN PATENT DOCUMENTS

EP          0267562      *  5/1988

* cited by examiner

Primary Examiner—Patricia A. Short
(74) Attorney, Agent, or Firm—Foley & Lardner

(57) ABSTRACT

Water-dilutable brushing paints based on water-soluble alkyd resins rendered water-soluble through neutralization of methacrylic acid groups thereon are described. The brushing paints have favorable applicational properties, especially with regard to wet-edge time and brushability.

9 Claims, No Drawings

WATER-DILUTABLE BRUSHING PAINT BASED ON WATER-SOLUBLE ALKYD RESINS

This is a continuation of application Ser. No. 07/561,269 filed on Jul. 31, 1990, now abandoned, which, in turn, is a continuation of application Ser. No. 07/207,870 filed on Jun. 17, 1988, now abandoned.

FIELD OF INVENTION

This invention relates to water-dilutable paints. More particularly, the invention relates to water-dilutable brushing paints based on water-soluble alkyd resins rendered water-soluble through neutralization of carboxy groups contained thereon derived from methacrylic acid.

BACKGROUND OF INVENTION

U.S. Pat. No. 4,333,865 discloses a method for preparing aqueous alkyd resin emulsions whereby the carboxy groups necessary for the stabilization of the emulsion are introduced through graft polymerization of methacrylic acid and other vinyl and acrylic monomers to a part of the unsaturated oil fatty acids used in the alkyd resin formation. All of the disclosed products contain polyethylene glycols or intermediates containing polyethylene glycols as an essential constituent. The polyethylene glycol is not introduced through an ester linkage which may be saponifiable in an aqueous medium, but rather is introduced through intermediate products. The products are used as such or in combination with urethane-modified alkyd resins. With these products air-drying, water-dilutable paints can be produced which excel in applicational properties and have outstanding storage stability. The products of the aforementioned patent containing polyethylene glycol have as another essential characteristic a maximum acid value of 35, and preferably an acid value below 25 mg KOH/g. Higher acid values invariably lead to paint films with insufficient water resistance. Although neutralization of the acid groups can be accomplished with alkali hydroxides or ammonia, paints with good gloss are obtained only when neutralization is with the use of organic amines.

According to AT-PS 375,667, emulsifier resins obtained through graft copolymerization of (meth)acrylic acid and other monomers based on polyethylene glycol-modified fatty acid polyolesters are used to prepare aqueous emulsions in combination with urethane-modified alkyd resins. Emulsions of this type are particularly suited for use in paints for wood; however, on aging, the paints yellow.

DE-OS 24 16 658 discloses that the reaction of acrylic acid or methacrylic acid with polyunsaturated fatty acids at from 250° C. to 300° C. provides adducts which can be processed to water-dilutable alkyd resins through esterification, preferably with polyglycols. The products have a relatively poor drying speed, since a major part of the fatty acids is lost for film formation through adduct formation at the time of dimerization which takes place at the necessarily high reaction temperature. Furthermore, pigment wetting is substantially reduced through the adduct formation without use of polyglycols in the subsequent alkyd resin formation.

Alkyd resins, free of polyethylene glycol, having an acid value of from 35 to 70 mg KOH/g, substantially based on methacrylic acid units which are used as "emulsifier resins" in the emulsion polymerization of vinyl and/or (meth)acrylic copolymers are described in commonly assigned European Application No. 87116502.3 filed Nov. 11, 1987, laid open May 18, 1988 under EU-OS 0267562. The methacrylic acid units are introduced into the alkyd resin as graft polymers. Emulsions are obtained according to the invention permitting the formulation of excellent air-drying, water-based paints. However, one disadvantage of such emulsions is with respect to aqueous brushing paints. Thus, the so-called wet-edge time which is the time within which the next part of a surface can be brushed without leading to leveling defects, or sticking of the brush when brushing the bordering areas, is very short. Although this time lag can be up to sixty minutes for a good brushing paint based on solvents, for dispersion paints it is often only two to three minutes. With the best alkyd copolymer dispersions, wet-edge time is at best about ten minutes. Accordingly, brushing of larger areas, such as doors, etc., can be accomplished only with difficulty by less experienced painters.

GENERAL DESCRIPTION OF INVENTION

Surprisingly it has now been found that air-drying brushing paints can be formulated having good wet-edge time based on alkyd resins, water-soluble upon partial or total neutralization of the carboxy groups, which are substantially graft copolymers of unsaturated fatty acids with blends of methacrylic acid and acryl-methacryl-vinyl monomers which carry no functional groups other than a double bond, and which preferably form benzene-dilutable homopolymers.

The present invention, therefore, is concerned with water-dilutable brushing paints based on alkyd resin binders, water-soluble upon partial or total neutralization, containing the normal pigments, extenders, and auxiliary solvents. The binder of the invention is an alkyd resin with a content of unsaturated fatty acids of from about 30% to 70%, preferably 40% to 60%. The free carboxy groups of the resin, corresponding to an acid value of from about 25 to 70 mg KOH/g, are derived up to at least 80% from methacrylic acid units. The methacrylic acid is graft polymerized prior to alkyd resin formation, together with 30% to 55% by weight, calculated on the resulting graft copolymer, of other vinyl and/or (meth)acrylic monomers carrying no reactive functional groups other than the —C═C— bond, to a part of the unsaturated fatty acids content of the alkyd resin. The conditions of the polymerization are controlled in order that the comonomers used together with methacrylic acid are such that up to at least 80% of the monomers when separately polymerized form benzene-soluble homopolymers.

The brushing paints of the present invention have a wet-edge time of twenty to forty minutes and are similar to alkyd resin paints based on solvents with regard to brushability, i.e., ease of brushing, leveling, radiance, and build. Also, the paints of this invention are at least equal to known alkyd resin emulsions with regard to storage stability and drying characteristics, two properties essential for brushing paints. Surprisingly, the products show good pigment wetting and gloss without the polyethylene glycols normally used in the production of alkyd resin emulsions. However, the use of polyethylene glycols is not precluded by this invention. In special cases they may help in paint formulation, for example when using some special pigments.

Another advantage of the alkyd resins of this invention is that the products can be neutralized with ammonia instead of organic amines to provide good wetting and radiance characteristics. The organic amines are not favored from the ecological standpoint.

The alkyd resins used for the brushing paints of the present invention are water-soluble through at least partial salt formation at their carboxylic groups with ammonia, alkali hydroxides, or organic amines. It is noted that the water-solubility does not necessarily lead to clear solutions. As known to one skilled in the art, the resins in these solutions have large resin micelles, so that the solutions may be opaque or even turbid.

As an essential feature, the alkyd resins of this invention have an acid value of 25 to 70 mg KOH/g, at least 80% of the acid groups being derived from methacrylic acid units, which, together with 30% to 55% by weight, calculated on the weight of the resulting graft copolymer, of other vinyl and/or (meth)acrylic monomers which carry no functional groups other than the —C=C— double bond, are graft polymerized in a separate reaction step to a part of the unsaturated fatty acids used in the alkyd preparation. The selection of the ethylenically unsaturated monomers, in addition to methacrylic acid, is made under the condition that at least 80% of the monomers will form benzene-soluble homopolymers when separately polymerized. The alkyd resins are prepared using conventional processes.

The content of drying and/or semi-drying fatty acids of the alkyd resins of this invention is from about 30% to 70% by weight, preferably between 40% and 60% by weight of the alkyd resin. Of these fatty acids, from about 10% to 40% by weight, calculated on the resin weight, is introduced in the form of fatty acid-methacrylic acid, graft copolymers.

The preferably used alkyd resins are characterized in that they contain from about 10% to 25% by weight of polyalcohols with 2 to 6 hydroxy groups, 10% to 20% by weight of aromatic and/or aliphatic dicarboxylic acids, 0% to 15% by weight of cyclic and/or polycyclic monocarboxylic acids, and 0% to 5% by weight of a polyethylene glycol. The products have an intrinsic viscosity of from about 7 to 16 ml/g, measured in chloroform at 20° C.

For the preparation of the grafted fatty acids, unsaturated fatty acids are used having an iodine value of over 135 (preferably 160–200) and with the double bonds being predominantly in isolated position. Suitable acids are, for example, linseed oil fatty acid, safflower oil fatty acid, and the fatty acids hempoil, Lallemantia-oil, Perilla-oil and Stillingia-oil, optionally in admixture with up to 25% of dehydrated castor oil fatty acid prepared through isomerization.

The fatty acid copolymers include 30% to 50% by weight of the above-mentioned fatty acids, 10% to 25% by weight methacrylic acid, and 30% to 55% by weight of other monomers which carry no other functional groups other than the —C=C— double bond, the sum of percentages being 100. The monomers used besides methacrylic acid are preferably (meth)acrylic compounds, particularly monomers which form benzene-soluble homopolymers. Suitable monomers include the esters of methacrylic and acrylic acid with n-butanol, iso-butanol, tert.-butanol, or 2-ethylhexanol. Vinyltoluol can be used for the adjustment of the optimum glass transition temperature of the copolymer and of the film hardness resulting therefrom.

The graft polymerization is carried out in order that the main quantity of the fatty acid, optionally in the presence of small quantities of inert solvents, is heated to 110° C. to 150° C. and the monomer blended with a suitable initiator, and the remaining fatty acid is added within the course of a few hours. The reaction is then held at reaction temperature until a determination of the solids content indicates a conversion of more than 95%. Suitable initiators include di-tert.-butylperoxide, tert.-butyl-perbenzoate, and cumol hydroxide.

The fatty acid/methacrylic acid graft copolymers are processed to water-soluble alkyd resins with further fatty acids. Suitable fatty acids for this step are vegetable or animal fatty acids with an iodine value of over 120. It is preferred that a part of the double bonds are in conjugated position. Suitable fatty acids include soya oil fatty acid, linseed oil fatty acid, safflower oil fatty acid, and dehydrated castor oil fatty acid.

Suitable polyols and dicarboxylic acids for use in preparing the alkyd resins are those conventionally used in the production of conventional alkyd resins. The preferred components are trimethylolethane, trimethylolpropane, pentaerythritol and sorbitol as the polyol, and ortho- or iso-phthalic acid as well as adipic acid as dicarboxylic acids. The film hardness can be controlled by using cyclic or polycyclic monocarboxylic acids such as rosin acids or benzoic acid, along with the dicarboxylic acids. Polyethylene glycols with a molecular weight of from about 1000 to 3000 can be introduced in an amount up to about 5%.

The esterification can be carried out through concurrent heating of all components. When using high melting raw materials, such as pentaerythritol and iso-phthalic acid, it can be desirable to first esterify the acids, polyols and dicarboxylic acid until a clear melt has formed, and subsequently add the fatty acid-methacrylic acid copolymers. The esterification is then carried to a final degree of about 90% of the concentration of methacrylic acid. Since these acid groups have a tertiary position in the copolymer chain, they are sterically hindered and, accordingly, it is theorized that they esterify with substantially reduced speed and, thus, at the end of the reaction, provide the major portion of the remaining acid groups which render the resin water-soluble. Since these acid groups are linked to the alkenyl chains of the fatty acids with —C=C— bonds and the preferred grafting sites of the isolated unsaturated fatty acids are the activated $CH_2$-groups of the $C_{11}$- and $C_{14}$-chain, there is a long molecular segment between the acid groups and the ester linkage which blocks the attack of water. Thus, the alkyd resin components according to the invention are superior in hydrolysis resistance over the known water-dilutable alkyd resins based on partial esters of o-phthalic acid, iso-phthalic acid, or trimellitic acid.

Suitable organic water-tolerant co-solvents include the methyl-, ethyl- and butyl-ethers of ethylene glycol, diethylene glycol, 1,2-propylene glycol, and dipropylene glycol. In portions, fairly water-tolerant solvents can be coemployed, such as n-butanol and iso-butanol. The total content of organic solvents in the finished paint should be kept as low as possible.

For the neutralization of the acid groups, ammonia is preferred. Other suitable neutralizing agents are the amines such as triethylamine, dimethylethanol amine, and the alkali hydroxides such as KOH, NaOH, and LiOH.

The alkyd resins are used either in neutralized or unneutralized form as a solution in water-tolerant solvents. The preferred form of the products are aqueous emulsions, since, in this way, the content of organic solvents can be substantially reduced.

The water-dilutable brushing paints of the present invention are prepared in a conventional manner. They may be applied as a clear varnish, for example as a water-dilutable wood glaze; or in pigmented form, as primers for wood or metal surfaces; or as trade paints and do-it-your-self paints. The pigments, extenders, and additives, such as the siccatives, anti-skinning aids, antifoams, etc., are known to one skilled in the art.

The paints are preferably prepared whereby the emulsions are mixed with the pigments and the additives are dispersed in suitable milling equipment such as a pearl mill, three roll mill, disperser, or the like.

The paints are applied by brush, dripping, spraying, or flow coating to dry at room temperature; or the paints can be force-dried at elevated temperatures of up to about 100° C.

Presently Preferred Embodiments

The following examples illustrate the invention without limiting its scope. Parts and percentages are by weight unless otherwise stated. The intrinsic viscosity values are measured in chloroform or dimethylformamide (DMF) at 20° C. and are recorded as ml/g.

(I) Preparation Of Fatty Acid/Methacrylic Acid Copolymers

Copolymer Cl: 30 parts linseed oil fatty acid and 5 parts xylol are heated to 135° C. to 140° C. At this temperature, within 6 to 8 hours, two blends are added simultaneously and continuously; one blend consisting of 32 parts isobutylmethacrylate, 6 parts vinyl toluol, and 21 parts methacrylic acid; and the other blend consisting of 11 parts linseed oil fatty acid, 3 parts tert.-butylperbenzoate, 1 parts dibenzoylperoxide (50%), and 5 parts xylol. At the end of the addition, the reaction temperature is maintained until a determination of the non-volatile content shows a polymerization conversion of at least 95%. One part of tert.-butylperbenzoate can be added, if desired, to accelerate the reaction. The copolymer has an acid value of 209 mg KOH/g and an intrinsic viscosity of 5.5 (DMF).

(II) Preparation Of Alkyd Resins

According to the composition listed in Table 1, alkyd resins are prepared as follows: In a suitable reaction vessel the components of Part 1, as set forth in Table 1, are esterified at 230° C. until a clear melt has formed. After another hour, Part 2, as set forth in the Table, is added and the batch reacted at 200° C. until the final values have been attained. After stripping the inert solvent from the copolymer, the batch is diluted with ethyleneglycol monobutylether to a solids content of 87% and then emulsified at 50° C. with a diluted aqueous ammonia solution. The quantity of ammonia and water is chosen such that a pH-value of 8.2 to 8.4 and a solids content of 40% results. The resin solutions are milky to transparent liquids, with pronounced structured viscosity.

TABLE 1

| Alkyd Resin | A1 | A2 | A3 | A4 | A5 | A6 |
|---|---|---|---|---|---|---|
| Part 1: | | | | | | |
| Safflower Fatty Acid | 200 | 240 | 150 | — | — | — |
| Isomerized Linoleic Acid* | 110 | 70 | 230 | 200 | 105 | 40 |
| Tall Oil Fatty Acid | — | — | — | 20 | 25 | 115 |
| Pentaerythritol | 115 | — | 115 | 35 | 30 | 115 |
| Trimethylolpropane | — | — | — | 80 | 85 | — |
| Di-trimethylolpropane | — | 212 | — | — | — | — |
| p-tert.-Butylbenzoic Acid | — | — | — | — | 65 | — |
| Paraformaldehyde, 89% | — | — | — | — | — | 16 |
| Isophthalic Acid | 100 | 100 | 80 | 100 | 100 | 100 |
| Part 2: | | | | | | |
| Fatty Acid Copolymer Cl | 340 | 340 | 340 | 195 | 270 | 195 |
| Characteristics: | | | | | | |
| Acid Value mg KOH/g | 45 | 49 | 43 | 33 | 49 | 37 |
| Intrinsic Viscosity (CHCl$_3$) | 12.5 | 10.0 | 9.5 | 12.8 | 9.5 | 12.0 |

*about 50% 9,11-linoleic acid

EXAMPLES 1 TO 4

Preparation Of Water-Dilutable White Brushing Paints

Titanium dioxide paints with a pigment binder ratio of about 1:1 are prepared in a conventional manner in the following formulation using alkyd resin emulsions A1, A3, A4, and A6, as set forth in Table 1, through grinding on a dissolver type Dyno-Mill:

| 260 parts | Resin Emulsion, 40% |
| 1.5 parts | Ammonia Solution, 25% |
| 100 parts | TiO$_2$, Rutile Type |
| 1 part | Combination Drier, Water-Dilutable (Co, Ba, Zr) |
| 2 parts | Anti-Skinning Agent (based on oximes) |
| 1 part | Antifoam (silicone-free) |
| 30 parts | Water |

260 parts Resin Emulsion, 40%

1.5 parts Ammonia Solution, 25%

100 parts TiO$_2$, Rutile Type 1 part Combination Drier, Water-Dilutable (Co, Ba, Zr)

2 parts Anti-Skinning Agent (based on oximes)

1 part Antifoam (silicone-free)

30 parts Water

The paints have a solids content of about 50% and, after adjustment of the pH-value to 8.5 to 9.0, are brushed onto wood panels. The test results are listed in Table 2.

EXAMPLES 5 TO 7

Preparation Of Water-Dilutable Primers

Water-dilutable primers are prepared using resin emulsions A1, A2, and A3 according to the following formulation:

| | |
|---|---|
| 220 parts | Resin Emulsion, About 40% |
| 70 parts | TiO$_2$, Rutile Type |
| 72 parts | Calcium Carbonate |
| 116 parts | Talcum |
| 1 part | Siccative Blend (see Example 1) |
| 1.5 parts | Anti-Skinning Agent (see Example 1) |
| 1.5 parts | Antifoam (silicone-free) |
| 30 parts | Water |

The paints have a solids content of about 66% and, after adjustment of the pH-value to 8.5 to 9.0, are brushed onto wood panels. The test results are listed in Table 2.

EXAMPLES 8 AND 9

Preparation Of Water-Dilutable Wood Glazes

Water-dilutable wood glazes are prepared using resin emulsions A2 and A5 according to the following formulation:

| | |
|---|---|
| 370 parts | Resin Emulsion, About 40% |
| 4 parts | Ammonia Solution, 25% |
| 4 parts | Siccative Blend (see Example 1) |
| 0.5 parts | Fungicide Solution |
| 32.5 parts | Matting Agent (based on polyethylene wax/surface-treated silica gel) |
| 14 parts | 1:1 Blend of Diethyleneglycol Monoethylether and an Aliphatic Hydrocarbon Solvent (boiling range 184° C.–207° C., aniline point 85° C., ASTM D-1012) |
| 2 parts | Anti-Skinning Agent (see Example 1) |
| 2 parts | Anti-Settling Agent (based on modified castor oil) |
| 2 parts | Antifoam (see Example 1) |
| 4 parts | Leveling Agent (containing silicone) |
| 45 parts | Water |

The glazes have a solids content of about 35%, a pH-value of 9.2, and an efflux time of 30–35 seconds, DIN 53211/20° C. The glaze is brushed onto fir panels. The test results are listed in Table 2.

For comparison, the following products were tested:

Paint VA: A paint according to Example 1 but with a binder according to AT-PS 377,990.

Paint VB: A dispersion paint for wood based on a copolymer dispersion of acrylic esters with medium viscosity.

Paint VC: A commercial trade paint based on a binder in organic solvents.

Paint VD: A commercial wood glaze which is water-dilutable.

The tests were carried out as follows:

1. Brushability: The processing characteristics of the materials were tested in a subjective manner with a grading of from 1=very good, to 5=very poor.
2. Wet-Edge Time: One-half of a wood panel was coated with the test paint. After five minutes, each of the recoatability of the bordering zone (wet-edge) was tested through stripe-wise application of the paint. At the listed time there is no longer leveling at the wet-edge.
3. Drying: Drying recorder at 20° C. with a wet film thickness of 150 μm on a glass strip.
4. Recoating: After the listed time, the films can be recoated without problems. The test is carried out at intervals of 12 hours.
5. Storage Stability Of The Paint: All paints could be processed without problems after a storage time of four weeks at 50° C., optionally after adjustment of the pH-value.

The results are set forth in Table 2.

TABLE 2

| | Brushing Paint | | | | Primer | | Glaze | | | Brushing Paint | | | Glaze |
|---|---|---|---|---|---|---|---|---|---|---|---|---|---|
| Test Example | 1 | 2 | 3 | 4 | 5 | 6 | 7 | 8 | 9 | V1 | V2 | V3 | V4 |
| Binder | A1 | A3 | A4 | A6 | A1 | A2 | A3 | A2 | A5 | VA | VB | VC | VD |
| Brushability | 1 | 1 | 1–2 | 1–2 | 1 | 1 | 1 | 1 | 1–2 | 1 | 3–4 | 1 | 2 |
| Wet-Edge Time (minutes) | 30 | 20 | 25 | 30 | 25 | 25 | 25 | — | — | 10 | 2 | 60 | — |
| Drying | | | | | | | | | | | | | |
| Tack Free (mins) | 110 | 110 | 90 | 90 | 20 | 25 | 25 | 30 | 20 | 90 | 60 | 300 | 60 |
| Touch-Dry (hrs). | 2.5 | 3.0 | 2.5 | 2.5 | 1.0 | 1.0 | 1.0 | 1.5 | 1.0 | 3.0 | 1.5 | 7.0 | 1.5 |
| Recoatability (hours) | 12 | 9 | 9 | 12 | 6 | 6 | 6 | 12 | 6 | 6 | 12 | 18 | 6 |

As will be apparent to one skilled in the art, various modifications can be made within the scope of the aforesaid description. Such modifications being within the ability of one skilled in the art form a part of the present invention and are embraced by the appended claims.

What is claimed is:

1. An air-drying water-dilutable brushing paint, comprising as a binder, an alkyd resin with a content of from 30 to 70% by weight of fatty acids, which fatty acids comprise unsaturated fatty acids and fatty acid graft copolymers, 10 to 25% by weight of polyalcohols having 2 to 6 hydroxyl groups, 10 to 20% by weight of aromatic or aliphatic dicarboxylic acids, 0% by weight of a polyethylene glycol, and an intrinsic viscosity of from about 7 to 16 ml/g, measured in chloroform at 20° C., wherein said alkyd resin has free carboxyl groups in an amount corresponding to an acid value of from about 25 to 70 mg/g, at least 80% of said carboxyl groups being derived from methacrylic acid units, and wherein from 10 to 40%, based on the weight of the alkyd resin, of said fatty acids are fatty acid graft polymers made by copolymerizing a mixture of 30 to 50% by weight of unsaturated fatty acids, 10 to 25% by weight of methacrylic acid, and 30 to 55% by weight of monomers selected from the group consisting of vinyl monomers and (meth)acryl monomers having no other functional group other than the —C═C— bond, all based on the weight of the resulting graft copolymer, and wherein at least 80% of the comonomers that are grafted together with the methacrylic acid, when polymerized separately, form benzene-soluble homopolymers.

2. The air-drying water-dilutable brushing paint of claim 1, wherein the acid groups of the alkyd resin are neutralized with neutralizing agents selected from the group consisting of ammonia, triethylamine, dimethyl ethanol amine, and alkali hydroxides.

3. The air-drying water-dilutable brushing paint of claim 1, wherein the unsaturated fatty acids used in the formation of the graft copolymer have an iodine value of greater than 135, and have double bonds predominantly in isolated position.

4. The air-drying water-dilutable brushing paint of claim 1, wherein the unsaturated fatty acids used in the formation of the graft copolymer are selected from the group consisting of linseed oil fatty acid, safflower oil fatty acid, hemp oil fatty acid, lallematia oil fatty acid, perilla oil fatty acid, and stillingia oil fatty acid.

5. The air-drying water-dilutable brushing paint of claim 1, wherein the monomers having no other functional group besides the —C=C— double bond are selected from the group consisting of esters of n-butanol, isobutanol, tert-butanol and 2-ethyl hexanol with acrylic acid, methacrylic acid or vinyl toluene.

6. The air-drying water-dilutable brushing paint of claim 1, wherein the fatty acids that are used in the esterification step to form the alkyd resin together with the fatty acid graft copolymers have an iodine value of greater than 120, and at least two double bonds in a conjugated position.

7. The air-drying water-dilutable brushing paint of claim 1, wherein the polyols are selected from the group consisting of trimethylol ethane, trimethylol propane, pentaerythritol, and sorbitol.

8. The air-drying water-dilutable brushing paint of claim 1, wherein the dicarboxylic acids are selected from the group consisting of ortho-phthalic acids, iso-phthalic acids and adipic acids.

9. The air-drying water-dilutable brushing paint of claim 1, wherein monocarboxylic acids selected from the group consisting of rosin acids and benzoic acid are used in the preparation of the alkyd resin.

\* \* \* \* \*